Dec. 18, 1945. K. J. KNUDSEN 2,391,168
ELECTRICAL RATIO METER
Filed Sept. 15, 1942 2 Sheets-Sheet 1

INVENTOR.
Knud J. Knudsen
BY John Harrow Leonard,
his Attorney.

Dec. 18, 1945.  K. J. KNUDSEN  2,391,168
ELECTRICAL RATIO METER
Filed Sept. 15, 1942  2 Sheets-Sheet 2

INVENTOR.
Knud J. Knudsen
BY John H Leonard
Attorney.

Patented Dec. 18, 1945

2,391,168

UNITED STATES PATENT OFFICE 2,391,168

ELECTRICAL RATIO METER

Knud J. Knudsen, Warren, Ohio

Application September 15, 1942, Serial No. 458,481

7 Claims. (Cl. 171—95)

This invention relates to a meter for indicating the ratio and direction of electrical currents and particularly to a meter of the direct current permanent magnet type having moving coils.

One of the principal objects is to provide a relatively high sensitivity and accurate meter of this general character in which it is possible to install or remove and replace the moving coil assembly as a unit complete in itself, without in any manner disturbing or deflecting the magnetic flux through the air gap of the magnetic circuit.

Another object is to provide a direct current meter which utilizes both the incoming and outgoing flux through a core for actuating the deflecting coil of a moving coil assembly so that the entire flux established in the air gap of the permanent magnet is utilized effectively for operating the moving coil.

A correlative object is to utilize the same major flux field that actuates the deflecting coil for causing the restoring torque of the restoring coil.

Another object is to provide such a ratio meter in which the restoring coil is actuated by an external electrical source which has a proportional effect on the deflecting coil and therfeore does not tend to change the position of the deflecting coil and attached instrument pointer due to changes in this source.

A specific object is to provide in a high sensitivity meter a bearing screw of a new design by which the bearing is held in place efficiently and securely and which is easily operated for installation, removal, and replacement of the moving coil assembly.

Another object is to provide a meter of this character in which the electrical zero point, i. e. the point at which no current passes in the deflecting coil, is at the approximate center of the indicating scale so that the amount of compensation that must be made for temperature is reduced relative to what is required in a straight line instrument for measuring currents and in which a means in the form of a calibrating resistor is provided for maintaining a substantially fixed ratio between the changes in conductivity of the deflecting coil and restoring coil resulting from changes in temperature, whereby variations in deflection of the deflecting coil, due to heating of the deflecting coil, are substantially compensated.

Another object is to provide an instrument of this character in which separate and independent adjustable means are provided: one for setting the instrument to indicate the electrical center at the center of the indicating scale, the other means for calibrating the full scale, whereby the usual tedious cut and try methods of adjustment, due to interrelated adjustable means necessitated because the electrical center is outside of the scale range, are eliminated.

Another object is to provide a meter in which the magnetic assembly and the moving coil assembly each is complete in and of itself whereby the magnetic circuit may be originally magnetized without the moving coil assembly being installed, thus protecting the delicate moving coil assembly from any damage caused by the shock occasioned during magnetization of the magnetic assembly.

Another object is to arrange the deflecting coil and restoring coil relative to a common core so that the flux is substantially equally available for both coils and both can be subjected to the same flux at all positions of movement.

Another object is to provide an instrument of this character which utilizes fewer parts than heretofore found necessary and which may be assembled more readily.

Other objects and advantages will become apparent from the following specification wherein reference is made to the drawings in which Fig. 1 is a front elevation of a meter embodying the principles of the present invention, assuming the meter to be positioned with the indicating dial exposed upwardly;

Ratio meters are utilized in numerous applications such as remote indication of fuel oil pressure, hydraulic pressures, differences in temperatures, and any other phenomena which, directly or through the interposition of mechanical or other means, causes proportional variations in current due to change in resistance.

Without intending to limit the present invention to the particular use shown, a preferred embodiment of the invention is illustrated in connection with a remote pressure indicating system for fuel oil pressure, its use for other purposes being readily apparent therefrom.

Referring to Figs. 1 to 4, inclusive, the meter comprises generally a magnetic circuit assembly and a moving coil assembly, each of which is a complete sub-assembly in and of itself so that each sub-assembly can be assembled separately and apart from the other and then the two assembled together easily.

Figure 1:
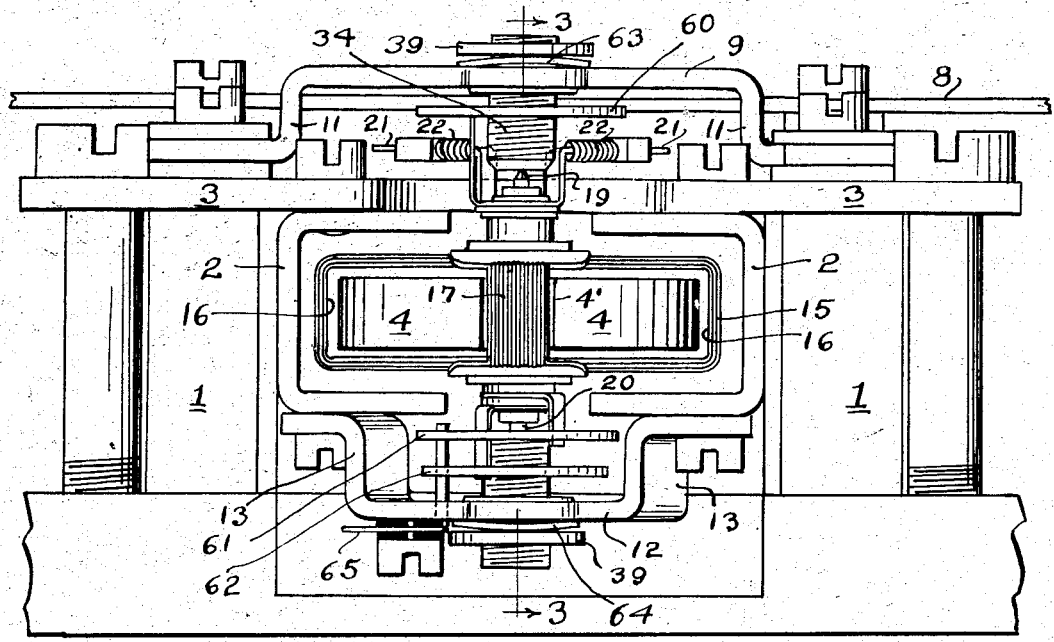
Figure 4:
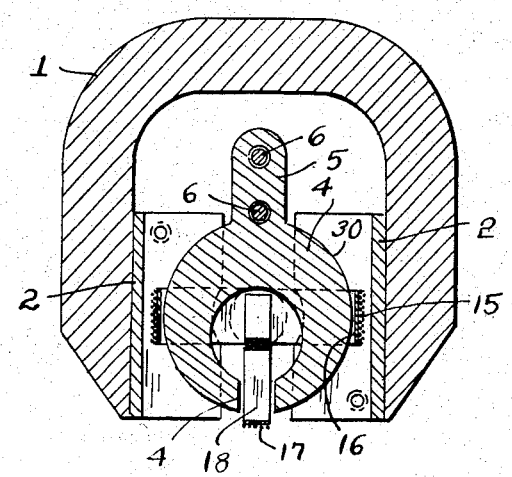
Fig. 4 is a horizontal sectional view taken on a line 4—4 in Fig. 3.

The magnetic assembly is best illustrated in Figs. 1 and 4 and comprises a permanent horseshoe magnet 1 for which generally channel-shaped iron pole pieces 2 are provided. The pole pieces 2 are fixedly secured to a non-magnetic top plate 3 and thus held permanently in fixed relation with regard to each other and with their bases snugly press fitted in contact with the inner faces of the arms of the magnet 1 and opening toward, and aligned with, each other.

Secured to the top plate 3 is a soft iron core 4 which is generally in the shape of an annulus with its outer perimeter generally circular but somewhat eccentric to the axis of the central opening so that more iron exists in the rear portion of the core to concentrate the flux in the air gap of the core. The core 4 has an integral rearward extension 5 through which the securing bolts 6 are passed for securing the core to the plate 3, the bolts 6 being of brass or other non-magnetic material. Interposed between the soft iron core 4 and top plate 3 are non-magnetic spacers 7 by which the core is definitely fixed in spaced relation axially and laterally from the pole pieces 2. It occupies the major portion of the space within the limits of the pole faces 2.

Secured to the top plate 3 by suitable screws is a non-magnetic dial plate 8. Mounted on the top plate 3 is a top bridge 9 which is of non-magnetic material, such as brass or phenolic or other synthetic resin and which is spaced a desired distance above the top plate by suitable integral non-magnetic portions or spacers 11. Carried by the pole pieces 2 and positioned below the lower level thereof, is a bottom bridge 12 of non-magnetic material and which is fixedly secured to the pole pieces 2 by suitable non-magnetic screws and is spaced from the pole pieces 2 by integral non-magnetic offset portions or spacers 13. The bridges 9 and 12 are arranged to support the moving coil assembly of the instrument and the entire structure above described, constituting, with the connecting parts, a magnetic assembly, may be readily made into a rigid unit before the installation of the moving coil assembly. The magnetic assembly provides a fixed magnetic circuit which is complete in and of itself.

The moving coil assembly also is complete in and of itself and comprises a deflecting coil 15 which is wound on a suitable light metal frame 16 and a restoring coil 17 which is wound on a light metal frame 18. The coils 15 and 17 lie between substantially the same spaced parallel planes and have their axes horizontal and arranged at right angles to each other. The deflecting coil 15 is mounted on suitable upper and lower aligned pivots 19 and 20 respectively. The axis of pivots 19 and 20 is at right angles to and passes through the axis of the deflecting coil 15.

Carried by the upper pivot 19 and movable therewith are a pair of suitable non-magnetic oppositely extending arms 21 on which are carried counter-poise weights of non-magnetic material respectively, the weights, preferably, being in the form of small coil springs 22. Likewise secured to the upper pivot and extending therefrom so as to overlie the dial plate 8 when the coils are installed in operating position in the magnetic assembly is a pointer or indicator arm 23 of non-magnetic material. Suitable electrical connections between the coils and the external circuit are provided, as hereinafter explained, and suitable insulation is provided throughout, all in a well known manner.

The core piece 4, as mentioned, is generally in the form of an annulus, but it is open at the forward portion to provide an air gap, as by spaced termini 4'.

On the upper and lower bridges are aligned bearings for engagement with the pivots 19 and 20 of the moving coil assembly for supporting the moving coil assembly in the magnetic field. The bearings are coaxial with an outer circular portion of the core piece 4 as will be described later.

The deflecting coil 15 is arranged with its axis at right angles to and intersecting the upright pivotal axis and the restoring coil 17 extends at right angles from the end of the deflecting coil so as to swing therewith about the pivotal axis. The opening through the deflecting coil is such that the coil surounds and accommodates with slight clearance the core piece 4. Thus upon rotation of the coil 15 about the pivots 19 and 20, the deflecting coil 15 swings about the core 4, maintaining a uniform spaced relation thereto. The restoring coil 17 is of the proper size to be received through the air gap of the core piece 4 and has a passage therethrough such that the coil accommodates with clearance first one and then the other of the arms of the core piece 4 as the deflecting coil 15 is swung about the pivots 19 and 20 in opposite directions from the air gap. Thus in all but a neutral position, the one illustrated, both coils are provided with an effective core so that the flux is most effectively utilized.

The moving coil assembly may be moved as a unit into place in the magnetic assembly and the pivots 19 and 20 connected in proper relation, then the electrical connections made.

In order to avoid possible breakage of the relatively small wires of the coil due to repeated oscillations, the terminals of the coils which are to be connected to the external circuit, as will hereinafter be disclosed, are preferably connected to phosphor bronze coiled leads or hair springs which preferably exert little or no resistance to movement of the moving coil assembly. Each of these springs is soldered at one end to its particular terminal of the coils and its other end is secured to the proper terminal of the external circuit by soldering or otherwise. In the form illustrated, in which three leads to the external circuit are necessary, the hair springs, 60, 61, and 62 are utilized. The springs, of course, are electrically insulated from the device and electrically connected to their respective connectors 63, 64, and 65 by which they are connected to the external circuit.

Figure 6:
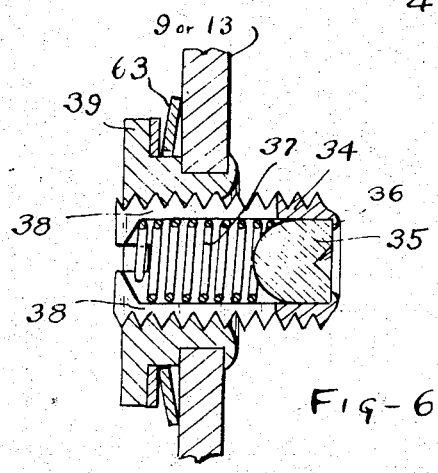
Fig. 6 is a longitudinal sectional view illustrating the jeweled bearing and mounting used in connection with the present invention.

In order to provide an effective and stable bearing for the pivots 19 and 20 and at the same time provide for ready installation, detachment and dismounting of the coil assembly, removable bearings, such as illustrated in Fig. 6, are used in the top and bottom bridges 9 and 12, respectively, for receiving the pivots 19 and 20, and are aligned with each other and coaxial with the outer circular surface 30 (Fig. 4) of the core piece 4. As illustrated in Fig. 6, each of these bearings may comprise a hollow screw 34 in which is slidably mounted a jewel or other bearing 35, shown as centrally socketed to receive the pointed end of the associated pivot. The screw 34 is provided with shoulders 36 (spun flange) to constrain the bearing from movement out of the inner end of the screw. Interposed between the bearing and the outer end of the screw and abutting a suitable shoulder inside the screw opposite the bearing is a radially expansible helical coil spring 37 which may be of spring brass or phosphor bronze and which urges the bearing 35 against the shoulder 36. The screw 34 is provided with a pair of expansion slots 38, or any appropriate plurality of slots, which extend longitudinally thereof part way of the length so that the screw may expand or be compressed radially as it is operated to force the bearing into place. The spring 37, when installed, is under sufficient stress to expand the slotted portion of the screw radially or to permit it to contract radially under outward yielding pressure and thus hold it resiliently but tightly in contact with its complementary threaded element.

For holding the screw 34 in position, a regulator lock 39 has internal threads in engagement with the external threads of the screw 34 and is riveted or otherwise held in place for rotational adjustment on the associated bridge. Distortion of the central portion of the regulator (screw 34) may be utilized to assure that the regulator locking screw remains in the adjusted position. Thus the bearings of the pivots 19 and 20 can be moved toward each other the proper distance and adjusted for supporting the moving coil assembly with the coils thereof surrounding the iron core 4 with substantially equal spaces between the upper and lower faces of the core and the upper and lower sides of the coils in all positions of the coil unit or assembly.

Figure 5:
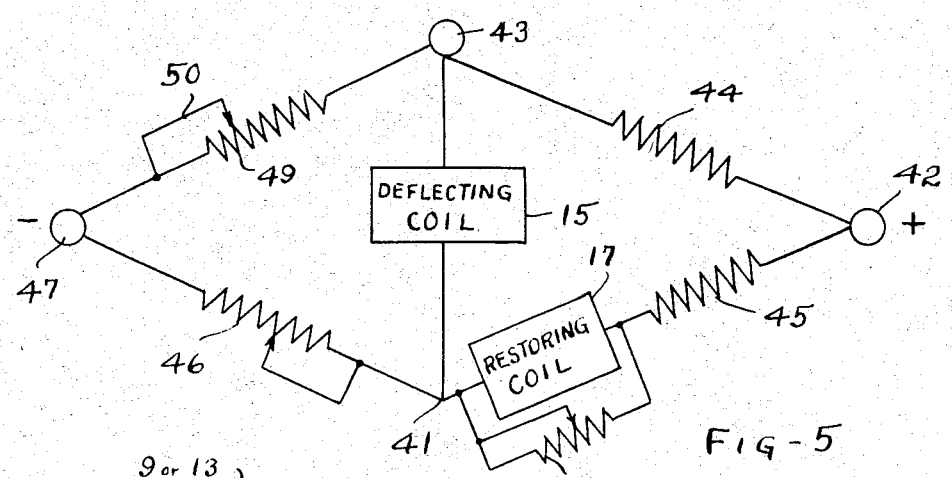
Fig. 5 is a wiring diagram of the meter connected for operation from a variable source of current to be measured.

Referring next to Fig. 5 the wiring diagram of the instrument is illustrated and a circuit is shown for measuring the current variation due to movement of a resistance controlling element which may be assumed to be operated by oil pressure. As illustrated in Fig. 5, the restoring coil 17 is connected in one arm of a Wheatstone bridge having terminals 41 and 42, terminal 41 of which is a galvanometer terminal and 42 of which is a battery terminal. The deflecting coil 15 is connected across the galvanometer terminal 41 and the other terminal 43 of the bridge. A resistor 45 is interposed between the restoring coil 17 and the terminal 42, and together with the restoring coil 17 forms one arm of the bridge. A resistor 44 of substantially equal ohmic value is connected between the terminals 42 and 43. A calibrating resistor 46 is connected between the galvanometer terminal 41 of the bridge and a battery terminal 47, the terminal 47 may be connected to the negative side of the battery or source of direct current and terminal 42 connected to the positive side of the battery, as shown. Interposed between the terminals 43 and 47 is an external controlling variable such as a variable resistor 49 which may have an adjusting arm 50 operated by oil pressure or any suitable means to vary the resistor 49. Alternatively, I may use a resistor of high temperature co-efficient capable of changing its resistance with change in temperature as in a temperature indicator. Between the terminal 41 and the resistor 45 a calibrating resistor 51 is connected in shunted relation around the restoring coil 17. The calibrating resistor is made from substantially zero temperature co-efficient wire, or wire the resistance of which does not substantially change with temperature, and serves to compensate for errors due to changes in ambient temperature. Examples of such wire are manganin and constantan.

Figure 3:
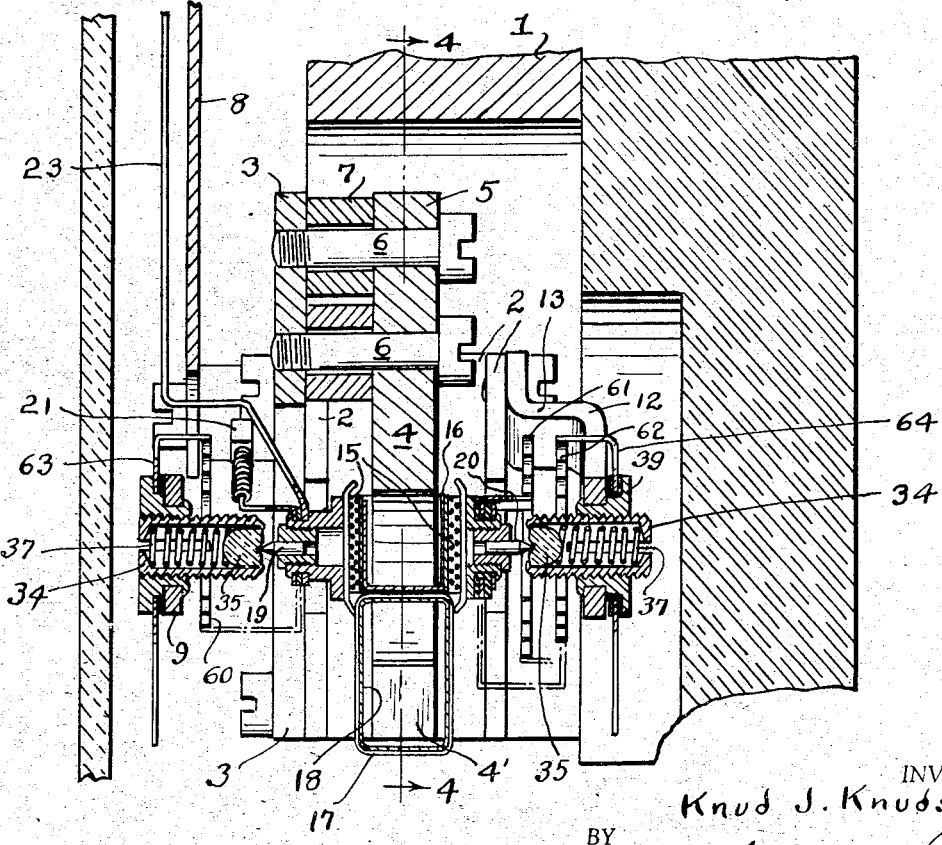
Fig. 3 is a cross sectional view taken on the line 3—3 in Figs. 1 and 2.

The deflecting coil 15 and restoring coil 17 may be connected to the cooperating elements of the circuit shown in Fig. 5 partly by means of spiral, current conducting, hairsprings, previously referred to, and shown at 60, 61 and 62 in Figs. 1 and 3. Pivoted adjuster arms 63 and 64 are indicated in Fig. 3 as connected to the springs 60 and 62, respectively, and a similar lead-in element is shown in Fig. 1 at 65 connected to the hairspring 61. One or both adjuster arms can have suitable insulative mountings if necessary to enable the arms to act as electrical conductors. The inner turns of the respective hair springs are connected to termini of the deflecting coils 15 and restoring coil 17 in any suitable manner, such as by connections suggested in Figs. 1 and 3 but not fully shown.

Figure 2:
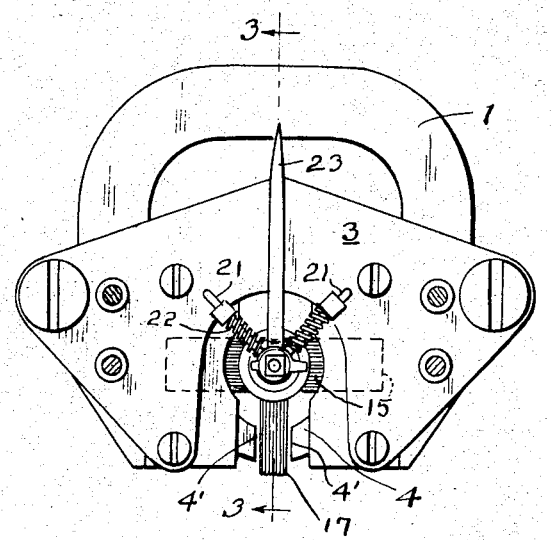
Fig. 2 is a plan view of the meter illustrated in Fig. 1, with the top bridge, dial plate, and coiled flexible connector removed for clearness in illustration.

In the structure thus illustrated, the hair springs are so wound that when no current whatever is applied to the device, the pointer or indicating arm 23 is at the left of the indicating dial and the restoring coil 17 is to the right of the air gap, termini 4', in the core as viewed in Fig. 2. Upon connection of the battery to the terminals 42 and 47, the indicator 23 moves to the central position on the dial in which position the restoring coil lies in the air gap of the core 4, providing there is no current in the deflecting coil, this being the electrical center of the instrument. Thereafter, with full negative current in the deflecting coil 15 the indicator moves to the left or counterclockwise and with the application of positive current moves to the right or clockwise beyond the middle position, thus indicating the direction and amount of unbalance of the Wheatstone bridge. By the use of the two calibrating resistors 46 and 51, the adjustment for neutral position or electrical center of the scale can be obtained with the resistor 46, while, with the resistor 51, adjustment for calibrating to the full scale can be obtained, thus eliminating the prior tedious cut and try methods which required that adjustment had to, be made simultaneously in some manner because the electrical center was suppressed and outside of the scale range.

Heretofore non-temperature co-efficient wire resistors have been used and such resistors have been used in series with the deflecting coil so as to prevent a substantial increase in resistance in the deflecting coil circuit with a consequent reduction in current and error in indication. This naturally reduces the efficiency of the indicating device. In the present invention, the calibrating resistor 51 of zero temperature co-efficient wire is connected in shunt with the restoring coil 17 and instead of being for the purpose of preventing an increase in the resistance of the deflecting coil, due to increases in ambient temperature, is used for the purpose of decreasing the current in the restoring coil, in a direct ratio to the decrease of the deflecting coil current. In the form shown, for example, when the current through the deflecting coil is decreased due to an increase in ambient temperature, a corresponding decrease in current takes place in the restoring coil in order to maintain a correct pointer position. Without the calibrating resistor 51 and due to the series connection of the resistor 45 with the restoring coil 17, the latter does not receive a proportional decrease in current. As a result, the ratio of the resistances of the two coils varies. By providing the calibrating resistor 51 in shunt with the restoring coil 17, the current through the restoring coil is maintained in a fixed ratio to that in the deflecting coil because a greater portion of the current passes through the shunt due to the increase of the resistance of the restoring coil. Thus the restoring effect of the restoring coil remains in a fixed ratio to the deflecting effect of the coil 15 with changes in ambient temperature.

In effect, therefore, the structure operates approximately as though the deflecting coil were subjected to the ambient temperature in the usual manner and had a return spring which in some manner was made operative so that its restoring torque was decreased in a fixed relation to the increase of ambient temperature at any given time due to higher resistance of the deflecting coil upon heating. Thus, where the prior structure sought to reduce the effects of heating of the deflecting coil and thus rendered the current less effective for operating the instrument, in the present structure heat effect is permitted to act upon the restoring coil so as to reduce its restoring effect and not to resist so greatly the torque of the deflecting coil.

As the moving coil assembly is deflected from the centered position, the restoring coil tends to restore the assembly to the center position with a force which is approximately proportional to the deflection in either direction from center and thus the instrument is in its true electrical sense a zero center galvanometer, even though the position of the pointer and moving coil assembly is to one side of center when no voltage is applied.

Furthermore, compensation for temperature errors has been greatly simplified by using a zero center instrument. For example, with no compensation, the percentage of error encountered in an instrument increases directly in proportion to the deflection from electrical center and at the high end of the deflecting scale, the error is considerably greater in instruments that have an electrical center suppressed below the end of the scale. Thus if a prior instrument had a 100° effective scale as compared to the present instrument with a 100° effective scale, the prior instrument would have to be depressed about 50°. Therefore the distance from electrical center to maximum deflection would be 150°, whereas in the present instrument it is only 50°. As a result, with no compensation there would be three times as much error in the suppressed center instrument as in the present instrument at maximum deflection. Therefore, compensation can be accomplished in the present instrument by the use of the appropriate non-temperature co-efficient resistor with a restoring coil, whereas such would not be as effective in the prior suppressed center structures.

It should be noted that the deflecting coil utilizes the full available flux, both incoming and outgoing, through the core and the restoring coil uses the main flux also, in contrast to prior instruments wherein the restoring coil uses only leakage flux, or each coil uses half of the main flux.

The terms "front, rear, horizontal, vertical, fore and aft direction" and the like are used herein and in the appended claims to denote relative positions of the parts, and not finite positions, for convenience in description. The various resistors, including 51, may be located remote from the other parts of the instrument, and for clearness, have been omitted in Figs. 1 to 4, as their physical location is, as is well known, a matter of convenience or choice.

I claim:

1. An instrument of the direct current moving coil type and comprising a horizontally disposed horseshoe magnet having its arms extending forwardly, a pair of generally channel-shaped pole pieces in fixed relation to the arms of the magnet, respectively, with their sides extending horizontally, said pole pieces opening toward and being in spaced relation to each other to define a major flux path, a horizontal generally circular core, means extending rearwardly from the core and fixedly supporting the core between the pole pieces in spaced relation thereto and with portions of the core extending part way within the open channels of the pole pieces, a pair of relatively axially adjustable bearings coaxial with the core and arranged one above and one below the core, pivot means mounted in said bearings, a deflecting coil carried by the pivot means with its axis horizontal and intersecting the axis of the pivot means at right angles, said coil having an axial passage of greater height and length than the height and outer diameter respectively of the core for accommodating the core within the coil with clearance in oscillated positions of the coil, said coil extending between the core and pole pieces with clearance relative to the pole pieces, and restoring means for the coil rigid therewith at right angles thereto and adapted to encircle arm portions of the core, said coil and restoring means being removable as a unit from the magnet and core assembly without disturbing the magnetic flux circuit of said assembly.

2. An instrument according to claim 1 and further characterized in that said core has a central aperture and an air gap in its forward portion and said restoring means is a restoring coil which is carried by the pivot means and has its axis horizontal and spaced forwardly from the pivotal axis and said restoring coil has a passage therethrough which accommodates respectively, the said arm portions of the core as the restoring coil oscillates about the pivotal axis, and the said restoring coil is of less width axially than said air gap, whereby the assembled coils and pivot means may be removed forwardly from the device without disturbing the magnetic circuit.

3. An electrical instrument of the moving coil type, comprising a magnet having opposed channel shaped pole pieces with the flanges of the channels facing each other and spaced apart in the same plane, a magnetic core centrally located between said pole pieces and having circular external peripheral surfaces uniformly spaced from the webs of the channels in the common plane thereof and providing spaced arms directed toward each other, a coil assembly including a deflecting coil pivoted on an axis generally centrally of the core, said coil being looped about the core and operatively related to the channel flanges so that opposite sides of the coil remain in substantially uniform cutting relation to flux lines passing between the flanges as the coil assembly is turned through an arc of at least 90°, said coil assembly also including a restoring coil fixed to the deflecting coil normal thereto and receivable between the arms of the core so as to encircle said arms in such turned positions of the coil assembly, said arrangement enabling the coils to be assembled as a unit into operative relationship to the pole pieces and core without disturbing the magnetic circuit afforded by the magnet and core.

4. An electrical instrument of the moving coil type, comprising a magnet having opposed channel shaped pole pieces extending in a fore and aft direction with the flanges of the channels facing each other and spaced apart in the same plane, a magnetic core having a central aperture with an upright axis, the core being centrally located between said pole pieces and having its external peripheral surfaces lying between said flanges and spaced therefrom and from the webs of the channels in the common plane thereof and providing spaced arms directed toward each other forwardly from said axis, the webs of the channels being spaced apart from each other a distance greater than the width of the core throughout those portions of the webs which are forward of said pivotal axis, a coil assembly including a deflecting coil having a pivotal axis generally parallel to the axis of the aperture, said coil being looped about the core in spaced relation thereto and to the channels and normally occupying a neutral position in which its axis is normal to its pivotal axis and extends in said fore and aft direction, the core and channel shaped pole pieces being related to render the flux path substantially uniform coextensive with the outermost limit of the path generated by rotating the deflecting coil through at least 45° in opposite directions from said neutral position, said coil assembly also including a restoring coil fixed to the deflecting coil normal thereto and receivable between the arms of the core so as to encircle said arms in turned positions of the coil assembly, said arrangement enabling the coils to be assembled as a unit into operative relationship to the pole pieces and core without disturbing the magnetic circuit afforded by the magnet and core.

5. In an instrument of the direct current moving coil type, a magnetic assembly complete in and of itself and including a pair of spaced pole faces and a core piece in fixed spaced relation thereto in the major flux path therebetween, a moving coil assembly complete in and of itself and including a deflecting coil and pivots therefor and fixedly secured thereto, the deflecting coil being adapted to lie within the major flux path between the pole pieces and core in spaced relation to the core and pole pieces and with its pivotal axis normal to the major flux path, and being receivable in said flux path and removable therefrom while the coil is in the moving coil assembly and while the magnetic assembly is in assembled condition, bearings for the pivots operable to be engaged with the pivots of the moving coil assembly, respectively, and to oscillatably support the assembly with the deflecting coil in said flux path and in spaced relation to the pole pieces and core, said deflecting coil having its axis normally extending at right angles to its pivotal axis and lying across the major flux path in a neutral position of said deflecting coil, said pole pieces and core being shaped relative to each other to render the major flux path substantially coextensive with the outermost limits of the path generated by rotating the deflection coil through an angle of at least 45° in each direction from its neutral position, whereby said coil assembly is operatively related to the magnetic assembly in a manner to enable uniform scale deflection through an arc of 90° and greater, and means to restore the moving coil assembly to starting position.

6. In an electrical instrument of the direct current moving coil type, a magnetic assembly comprising a permanent magnet, a pair of laterally spaced pole pieces, a core between and in fixed spaced relation to the pole pieces, said pole pieces and core defining a coil receiving space which comprises the major flux path and which is open at the front, relatively axially adjustable upper and lower axially aligned bearings above and below the pole pieces and in fixed lateral relation thereto, a moving coil assembly including a deflecting coil and a restoring coil, upper and lower axially aligned pivots fixedly secured thereto and receivable in the bearings, respectively, the axis of the deflecting coil being at right angles to the pivotal axis, and normally extending forwardly across the major flux path in a neutral position of said deflecting coil, said core and pole pieces being shaped relative to each other to render the major flux path substantially uniform coextensive with the outermost limits of the path generated by rotating the deflecting coil through an angle of at least 45° in each direction from its neutral position, said deflecting coil having a central passage and being receivable into said space from the open front, and being adapted to pass into surrounding relation to the core and into spaced relation to the pole pieces and core when so received, whereby said coil assembly is operatively related to the magnetic assembly in a manner to enable uniform scale deflection through an angle of 90° and greater.

7. An instrument according to claim 6 and further characterized in that the restoring coil is fixedly carried by the moving coil assembly, the axis of the restoring coil being at right angles to and spaced from the axis of the pivots and at right angles to the axis of the deflecting coil, said core having a central aperture and an air gap at its forward portion connecting therewith and dividing the core into two integral arm portions between the ends of which the restoring coil may be passed without disturbance of the magnetic circuit, said restoring coil having a passage therethrough and surrounding the core for accommodating the arm portions of the core in spaced relation thereto when the coil assembly is swung about its pivotal axis out of neutral position.

KNUD J. KNUDSEN.